(12) United States Patent
Eisner et al.

(10) Patent No.: US 7,177,400 B2
(45) Date of Patent: Feb. 13, 2007

(54) SYSTEM AND METHOD FOR PROVIDING A MAP IMAGE SUPPLEMENTAL TO AUTOMATIC LOCATION IDENTIFICATION INFORMATION

(75) Inventors: Gerald R. Eisner, Naperville, IL (US); Michael Arthur Koepke, Geneva, IL (US); Eileen Kaye Boroski, Elmhurst, IL (US)

(73) Assignee: Intrado Inc., Longmont, CO (US)

( * ) Notice: Subject to any disclaimer, the term of this patent is extended or adjusted under 35 U.S.C. 154(b) by 0 days.

(21) Appl. No.: 11/039,140

(22) Filed: Jan. 19, 2005

(65) Prior Publication Data

US 2006/0159235 A1    Jul. 20, 2006

(51) Int. Cl.
*H04M 11/00* (2006.01)
(52) U.S. Cl. ..................... 379/45; 455/404.2
(58) Field of Classification Search ............. 379/45, 379/37, 93.23, 93.25, 93.17; 455/404.01, 455/404.02
See application file for complete search history.

(56) References Cited

U.S. PATENT DOCUMENTS

| | | | |
|---|---|---|---|
| 3,864,522 A | 2/1975 | DeKozan et al. | |
| 4,052,569 A | 10/1977 | Pirnie, III | |
| 4,660,037 A | 4/1987 | Nakamura | |
| 4,812,980 A | 3/1989 | Yamada et al. | |
| 5,021,794 A | 6/1991 | Lawrence | |
| 5,077,788 A | 12/1991 | Cook et al. | |
| 5,109,399 A * | 4/1992 | Thompson | 379/45 |
| 5,150,096 A | 9/1992 | Lake, Jr. | |
| 5,161,180 A | 11/1992 | Chavous | |
| 5,799,061 A * | 8/1998 | Melcher et al. | 379/45 |
| 5,960,337 A | 9/1999 | Brewster et al. | |
| 6,064,722 A | 5/2000 | Clise et al. | |
| 6,073,004 A | 6/2000 | Balachandran | |
| 6,233,518 B1 | 5/2001 | Lee | |
| 6,236,849 B1 | 5/2001 | Reudink et al. | |
| 6,282,489 B1 | 8/2001 | Bellesfield et al. | |
| 6,385,302 B1 * | 5/2002 | Antonucci et al. | 379/45 |
| 6,408,307 B1 | 6/2002 | Semple et al. | |
| 6,430,411 B1 | 8/2002 | Lempio et al. | |
| 6,459,782 B1 | 10/2002 | Bedrosian et al. | |
| 6,498,982 B2 | 12/2002 | Bellesfield et al. | |
| 6,591,168 B2 | 7/2003 | Okinak et al. | |
| 6,690,932 B1 * | 2/2004 | Barnier et al. | 379/45 |
| 6,744,858 B1 * | 6/2004 | Ryan et al. | 379/45 |

(Continued)

FOREIGN PATENT DOCUMENTS

DE    19601334    7/1997

(Continued)

*Primary Examiner*—Stella Woo

(57) ABSTRACT

A system and method that provides a map image as part of, or along with, ALI information by dispatching a map query to a central map server after receipt of the ALI information, which includes an address, geo-coordinates or both. A map image corresponding to the requested location is returned. The ALI database may request the map image after retrieving or determining the location of the caller. Data to generate map images is stored in a central server or group of servers. In this manner, the data only has to be updated once for all users to have the updates. Further, the map server may be connected to wireline telephone facilities, wireless telephone facilities, or both, in a manner that is complimentary to the topography of the telephone network.

15 Claims, 7 Drawing Sheets

U.S. PATENT DOCUMENTS

| | | |
|---|---|---|
| 6,771,742 B2 * | 8/2004 | McCalmont et al. .......... 379/45 |
| 6,775,356 B2 * | 8/2004 | Salvucci et al. ............... 379/45 |
| 2002/0000999 A1 | 1/2002 | McCarty et al. |
| 2002/0019699 A1 | 2/2002 | McCarty et al. |
| 2004/0064256 A1 * | 4/2004 | Barinek et al. ................ 702/5 |

FOREIGN PATENT DOCUMENTS

| | | |
|---|---|---|
| JP | 63095764 | 8/1988 |
| JP | 63299659 A | 12/1988 |
| JP | 2002245580 | 8/2002 |

* cited by examiner

SYSTEM AND METHOD FOR PROVIDING A MAP IMAGE SUPPLEMENTAL TO AUTOMATIC LOCATION IDENTIFICATION INFORMATION

FIELD OF THE INVENTION

This invention relates to the field of providing geo-location map images, and, more specifically, to generating geo-location map images from a central server on an as-needed basis to supplement automatic location identification information.

BACKGROUND OF THE INVENTION

Many governmental, utility and other agencies rely on automatic location identification (ALI) information to provide up-to-date location and other data related to a calling telephone. An ALI system (also referred to herein as "ALI database") receives a telephone number (usually the automatic number identification or "ANI") and uses the telephone number as a key into a regional or national ALI database. The ALI database returns whatever information it has regarding the telephone number. For landline telephone numbers, the data includes an address associated with the telephone number. More recently, the ALI system returns geo-location coordinates of wireless telephones.

In the current art, addresses, geo-location coordinates, or both are commonly used as a key into a mapping database. Such maps help guide the agency to the location of the calling telephone. Thus, map images are an important tool in routing services as quickly and accurately as possible.

A problem in this art, however, is that mapping systems used to provide such services are expensive and usually area specific. Such mapping systems require dedicated software, and sometimes dedicated hardware, to meet the requirements of most ALI systems. Further, each mapping system must be updated frequently to reflect changes in geography, for example, when a new subdivision is started. For many agencies that rely on ALI systems for location information, the costs associated with such mapping systems are prohibitive. Further, a mapping system at one answering point may not have accurate data for a region served by another answering point, which is problematic when the first answering point "covers" for the other answering point (during times of network congestion or outage, for example).

SUMMARY OF THE INVENTION

This problem is solved and a technical advance is achieved in the art by a system and method that provides a map image as a supplement to ALI information. In one embodiment, a map query is dispatched to a central map server after receipt of the ALI information, which includes an address, geo-coordinates or both. A map image corresponding to the requested location is returned. In another embodiment, a map image is generated at the map server and is returned along with the ALI information. In this embodiment, the ALI database requests the map image after retrieving or determining the location of the caller.

In a system embodiment, data to generate map images is stored in a central server or group of servers, which serves a wide area. In this manner, data in the map server only has to be updated once for all users to have access to the updates.

BRIEF DESCRIPTION OF THE DRAWINGS

A more complete understanding of this invention may be obtained from a consideration of this specification taken in conjunction with the drawings, in which.

DETAILED DESCRIPTION

Figure 1:
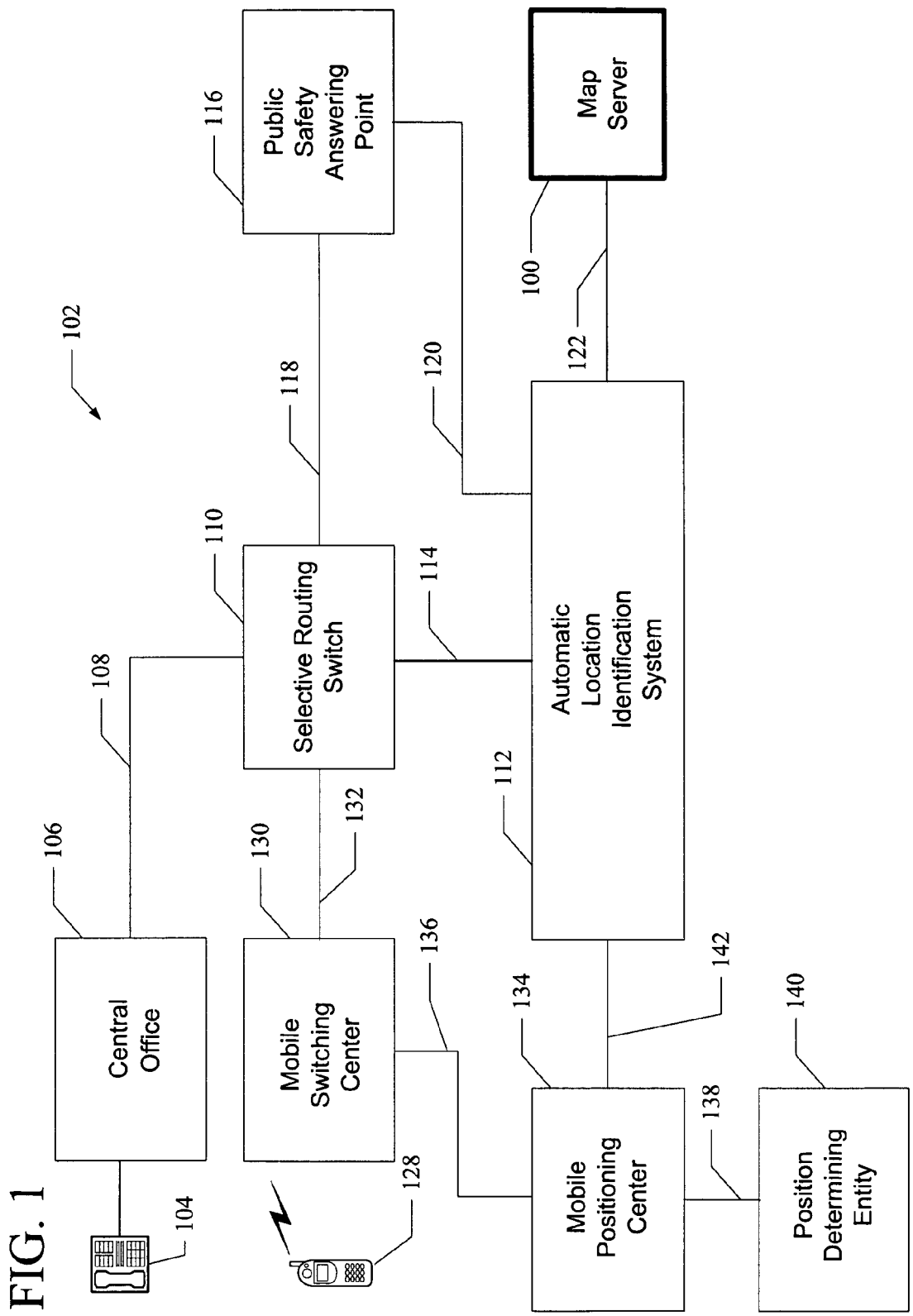
FIG. 1 is a block diagram of an exemplary telecommunications network in which exemplary embodiments of this invention operate.
Figure 2:
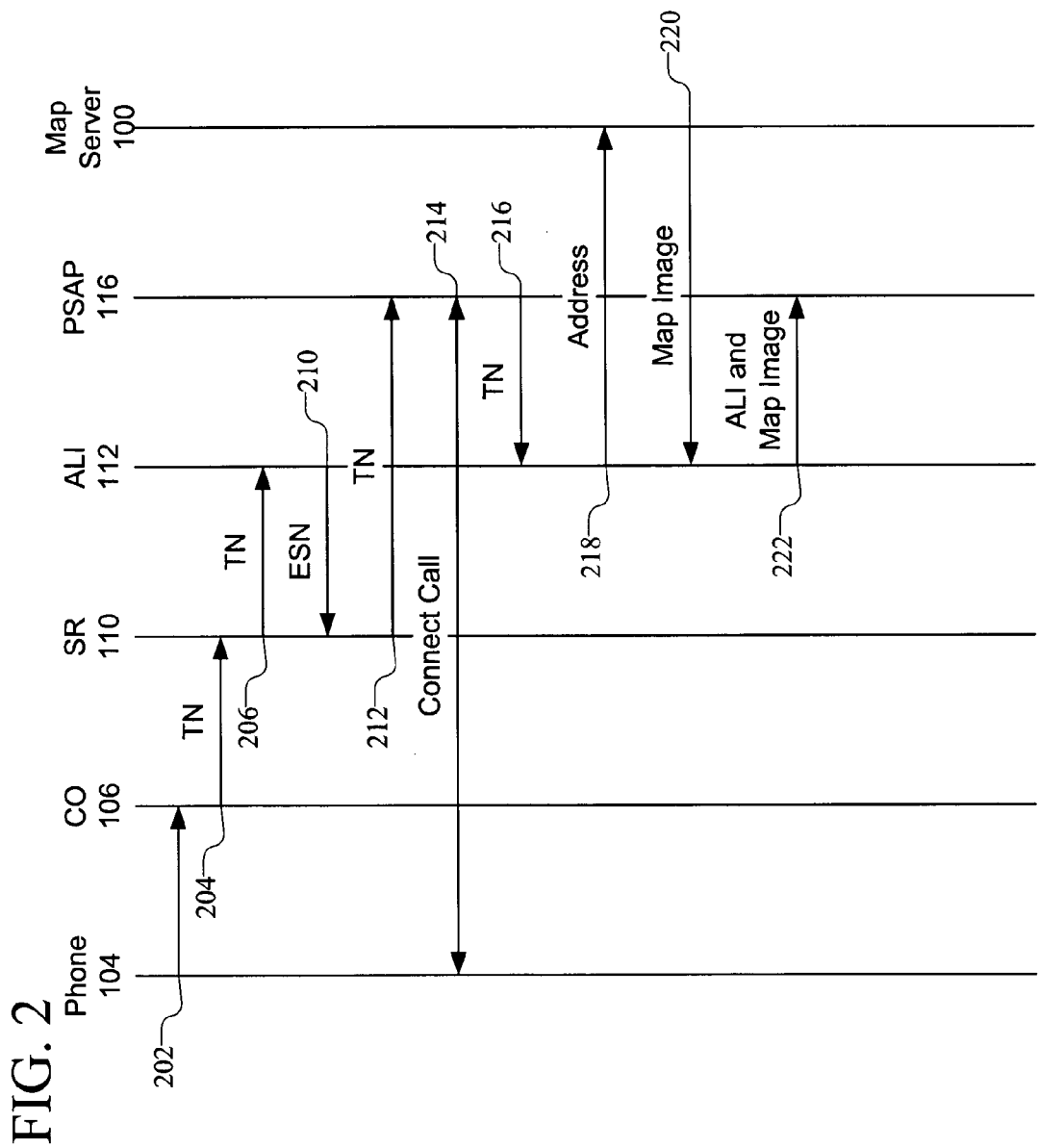
FIG. 2 is a communications flow diagram illustrating a call flow for a wireline call among the components of the exemplary telecommunications network of FIG. 1.

Turning now to FIGS. 1 and 2, an exemplary embodiment of obtaining a map on an ad-hoc, as-needed basis from map server 100 (shown in heavy block line) is shown. FIG. 1 illustrates a block diagram of an exemplary telecommunications network 102, and FIG. 2 illustrates a call flow for a wireline call through exemplary telecommunications network 102. This invention is described in the context of an emergency call (commonly known as a "9-1-1 call"). While this invention is described in a 9-1-1 call context, the application of this invention is much broader. For example, utility companies may use an embodiment of this invention to obtain a map image in order to find downed power lines, broken water lines, etc. One skilled in the art will appreciate how to adapt this invention to a specific application after studying this specification.

A caller at wireline telephone 104 dials a special number, which, in this example, is "9-1-1" (202). Central office 106, which is connected to telephone 104, recognizes from the dialed digits that this call receives special treatment. Central office 106 seizes a trunk 108 to selective routing switch 110 and transmits the telephone number of telephone 104 (204) to selective routing switch 110, as is known in the art and therefore not further described. The phrase "telephone number" ("TN") is used interchangeably in this specification with "directory number" or "DN." Further, in the telecommunications context, the telephone number or directory number is referred to as the automatic number identification (ANI) when the DN is sent from one network component to another.

Selective routing switch 110 forwards the TN of telephone 104 to automatic location identification (ALI) system 112 along communications path 114 (206). ALI system 112 selects a public safety answering point (PSAP) 116 to assign to the call based on the TN, in accordance with one of many algorithms known in the art. ALI system 112 delivers an emergency services number (ESN) to identify the serving PSAP back to selective routing switch 110 (210). Selective routing switch 110 then connects to PSAP 116 via trunk 118 and forwards the TN of telephone 104 (212). The call is connected between PSAP 116 and telephone 104 at 214.

When PSAP 116 receives the call, it forwards the TN of telephone 104 to ALI system 112 (216). ALI system 112 performs a database lookup using the TN as a key and retrieves all records associated with that number. One of the records may include a street address. Alternatively, one of the records may include geo-location coordinates or both a street address and geo-location coordinates.

ALI system 112 delivers the street address, geo-location coordinates or both to map server 100 over communications line 122 (218). Upon receipt of the street address, geo-location coordinates or both, map server 100 generates a map image based upon such input and predetermined parameters. Such predetermined parameters include, but are not limited to, scale, detail, landmarks and street identification. These parameters may be fixed, may vary depending upon input parameters from ALI system 112 or may vary depending upon geographic location requested. One skilled in the art will appreciate that many other parameters may be used in the generation of the map image after studying this specification.

Map server 100, in this exemplary embodiment, returns a map image in ".gif" format to ALI system 112 (220). The ".gif" format is used herein because it can be displayed by many operating systems, browsers, etc. One skilled in the art will appreciate that other formats, such as JPEG, PNG, TIFF, etc., may be used depending upon the application after study of this specification.

ALI 112 returns its ALI data and the generated map image to PSAP 116 (222). PSAP 116 displays such information at an operator position (not shown but well known in the art). The map image may be forwarded from PSAP 116 to other PSAP's, to service vehicles, etc., in the same manner as ALI data.

Figure 3:
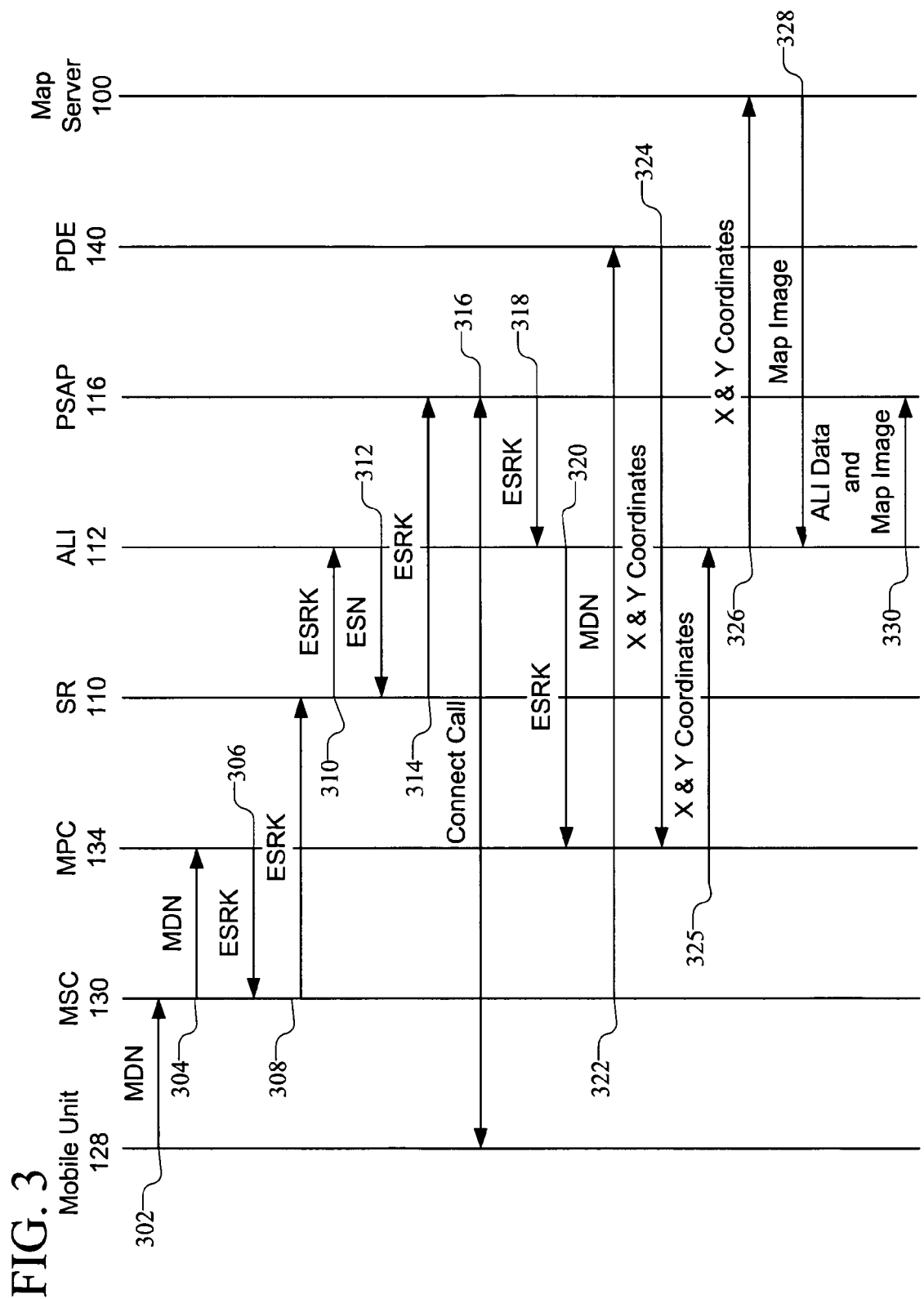
FIG. 3 is a communications flow diagram illustrating a call flow for a wireless call among the components of the exemplary telecommunications network of FIG. 1.

An emergency call from a wireless unit will now be described in the context of FIG. 1 and FIG. 3. In this exemplary embodiment, the user of a wireless unit 128 places an emergency call by dialing 9-1-1, 9-9-9, *9-9-9 or whatever code the local service provider uses (302). Mobile switching center (MSC) 130 receives the call and contacts mobile positioning center (MPC) 134 over line 136 to determine the location of wireless unit 128 in order to establish a geographical area for routing the call to an appropriate PSAP (304).

MPC 134 returns an emergency services routing key (ESRK) as an identifier of the position of wireless unit 128 to mobile positioning center 134 (306), which returns the ESRK to MSC 130. MSC 130 then sends the ESRK to selective routing switch 110 (308), as is known in the art. One skilled in the art will appreciate that an ESRD may also be used depending on the call delivery technique employed.

Selective routing switch 110 queries ALI system 112 using the ESRK as a key (310) to determine the PSAP that serves the geographical area of the emergency. ALI system 112 determines which PSAP (in this example, PSAP 116) to direct the call based on the ESRK and delivers the ESN of PSAP 116 to selective router 110 (312). Selective router 110 delivers the ESRK to the PSAP 116 (314) and then extends the call to PSAP 116 (316).

PSAP 116 queries ALI system 112 with the ESRK along communications link 120 to retrieve all ALI data associated with wireless unit 128 (318). ALI system 112 forwards the ESRK to MPC 134 (320). MPC 134 queries position determining entity (PDE) 140 for the geo-location coordinates of the mobile unit, wherein MPC 134 forwards the mobile unit's MDN to PDE 140 (322). PDE 140 determines the geo-location coordinates (herein also referred to as "x and y coordinates") and delivers them to MPC 134 (324), which delivers them to ALI system 112 (325).

In accordance with this exemplary embodiment, ALI system 112 sends the x and y coordinates to map server 100 (326). Map server 100 generates an image file, and returns the map image to ALI system 112 (328). ALI system 112 sends all ALI data and the map image file to PSAP 116 (330).

While the above wireline call scenario is described in terms of circuit-switched call processing, one skilled in the art will appreciate how to adapt the present invention to voice over Internet protocol (VoIP) and other call processing systems after studying this specification. While the above wireless scenario is described in terms of ANSI wireless call processing, one skilled in the art will appreciate how to adapt the invention to other wireless telephony networks, such as GSM, after studying this specification. Further, one skilled in the art will appreciate how to adapt the present invention to be responsive to automatic collision notification systems after studying this specification.

In the above-described manner, a map image may be generated for each call. This system provides a lower cost to governments and utilities because they do not have to purchase a mapping system for each call answering center, or, as in most applications, a mapping system for each station in the call answering center. Further, the cost, in both time and money, to update map server 100 is incurred only once per update. Therefore, map server 100 provides a cost savings to most call centers and make map images available to those call centers that previously could not afford them.

Figure 4:
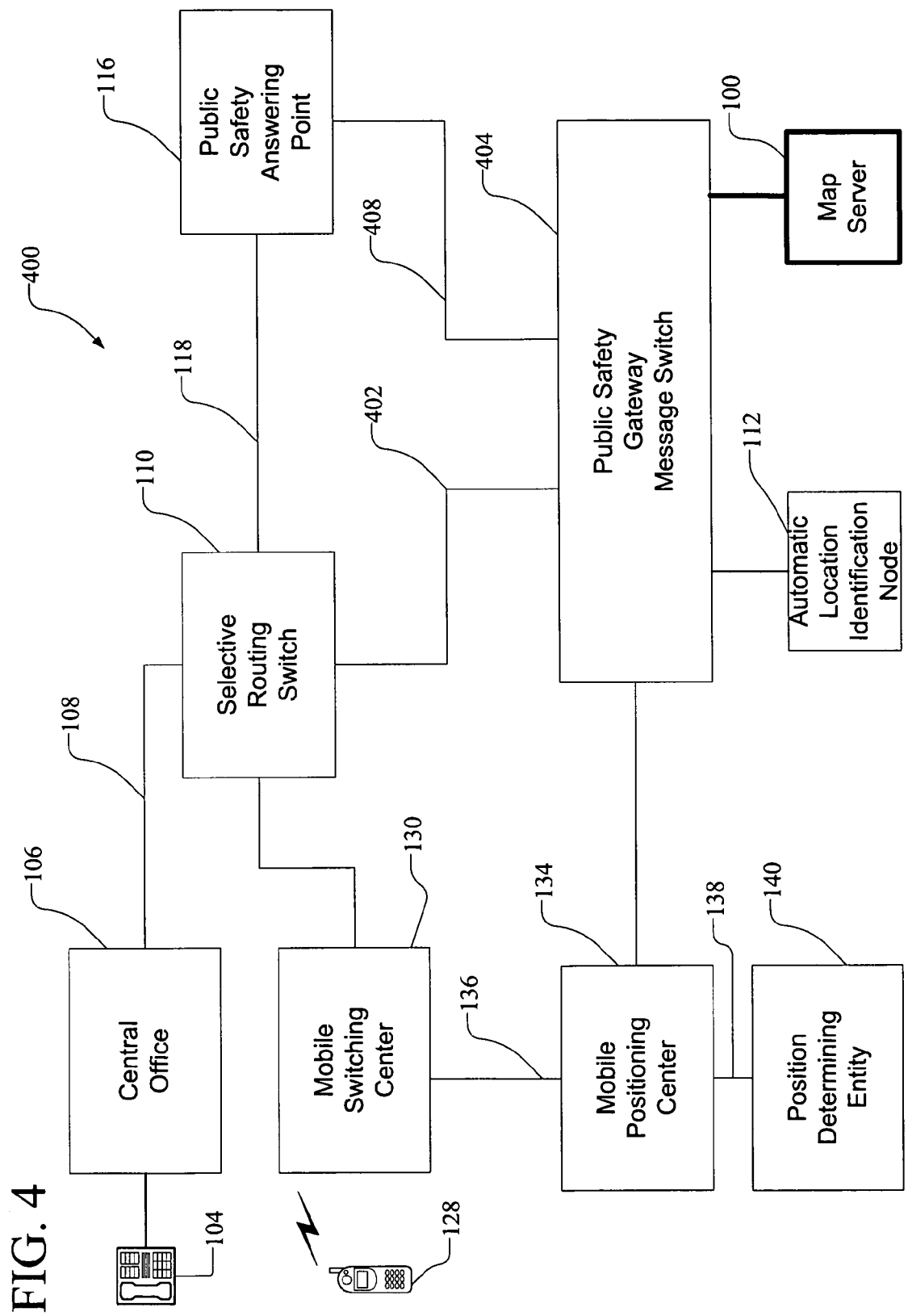
FIG. 4 is a block diagram of another exemplary telecommunications network in which exemplary embodiments of this invention operate.
Figure 5:
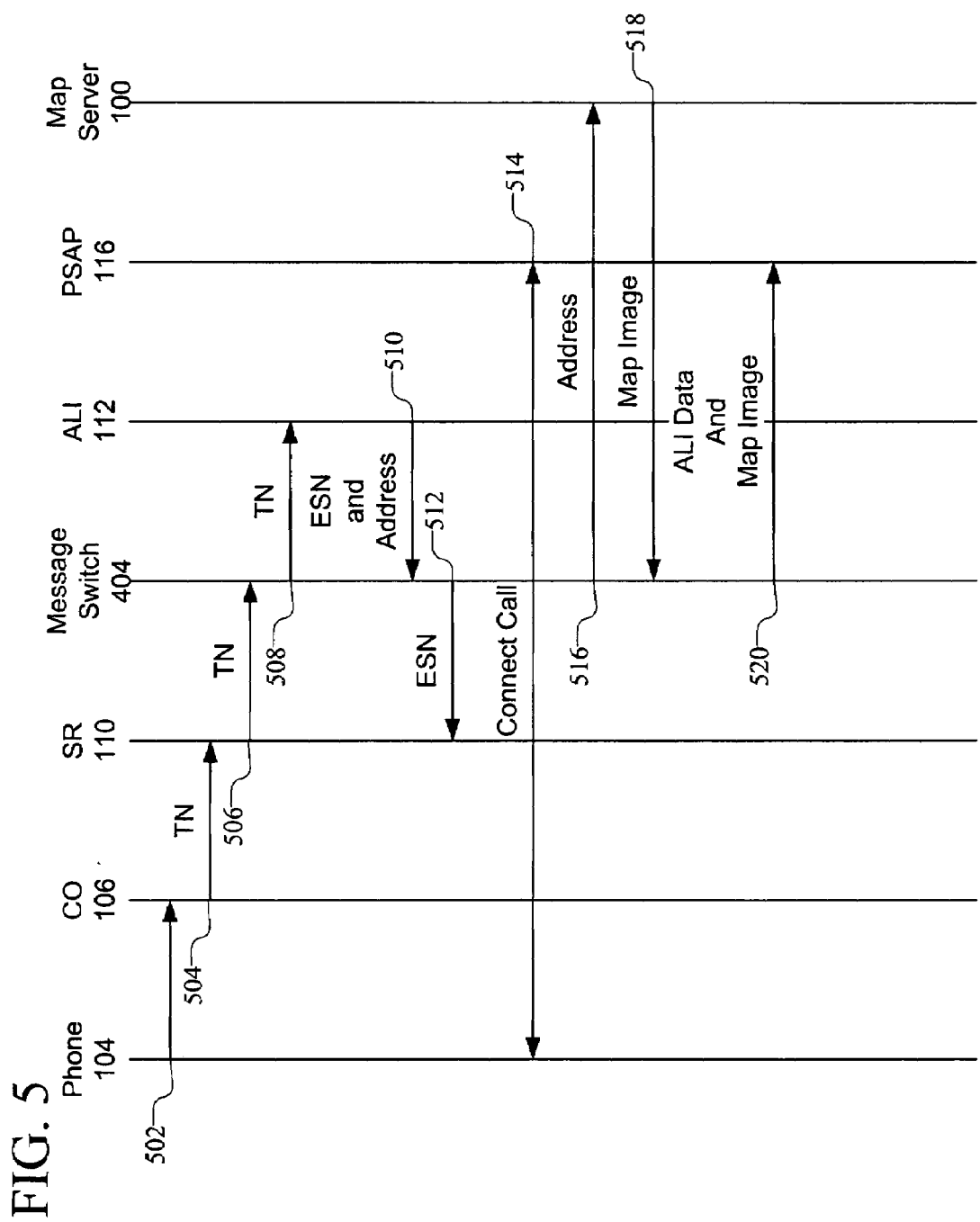
FIG. 5 is a communications flow diagram illustrating a call flow for a wireline call among the components of the exemplary telecommunications network of FIG. 4.

Turning now to FIGS. 4 and 5, a further exemplary embodiment of this invention is described in connection with an alternative network architecture. In contrast to FIG. 1, selective routing switch 110 is connected via line 402 to a public safety gateway message switch 404 (herein "message switch"). Message switch 404 acts as an emergency information broker in the context of the communications network 400 of FIG. 4.

In the context of FIGS. 4 and 5, a user at telephone 104 calls "9-1-1." Central office 106 receives the call and determines the telephone number (TN) of the calling telephone (502). Central office 106 routes the call to a selective router 110 and passes the TN of the calling telephone (504). Selective router 110 forwards the TN to message switch 404 (506). Message switch 404 forwards the TN to ALI node 112 to determine which PSAP to route the call to. ALI node 112 forwards the ESN of the PSAP that serves telephone 104 and also forwards the address of telephone 104 to message switch 404 (510).

Message switch 404 forwards the ESN to selective router 110 (512), which connects the call to PSAP 116 (514). At approximately the same time, message switch 404 sends the address to map server 100 (516). Map server 100 generates the map image and returns it to message switch 404 (518). Message switch 404 then forwards all ALI data and the map image to PSAP 116 (520) for use at the emergency services station that is serving the call.

Figure 6:
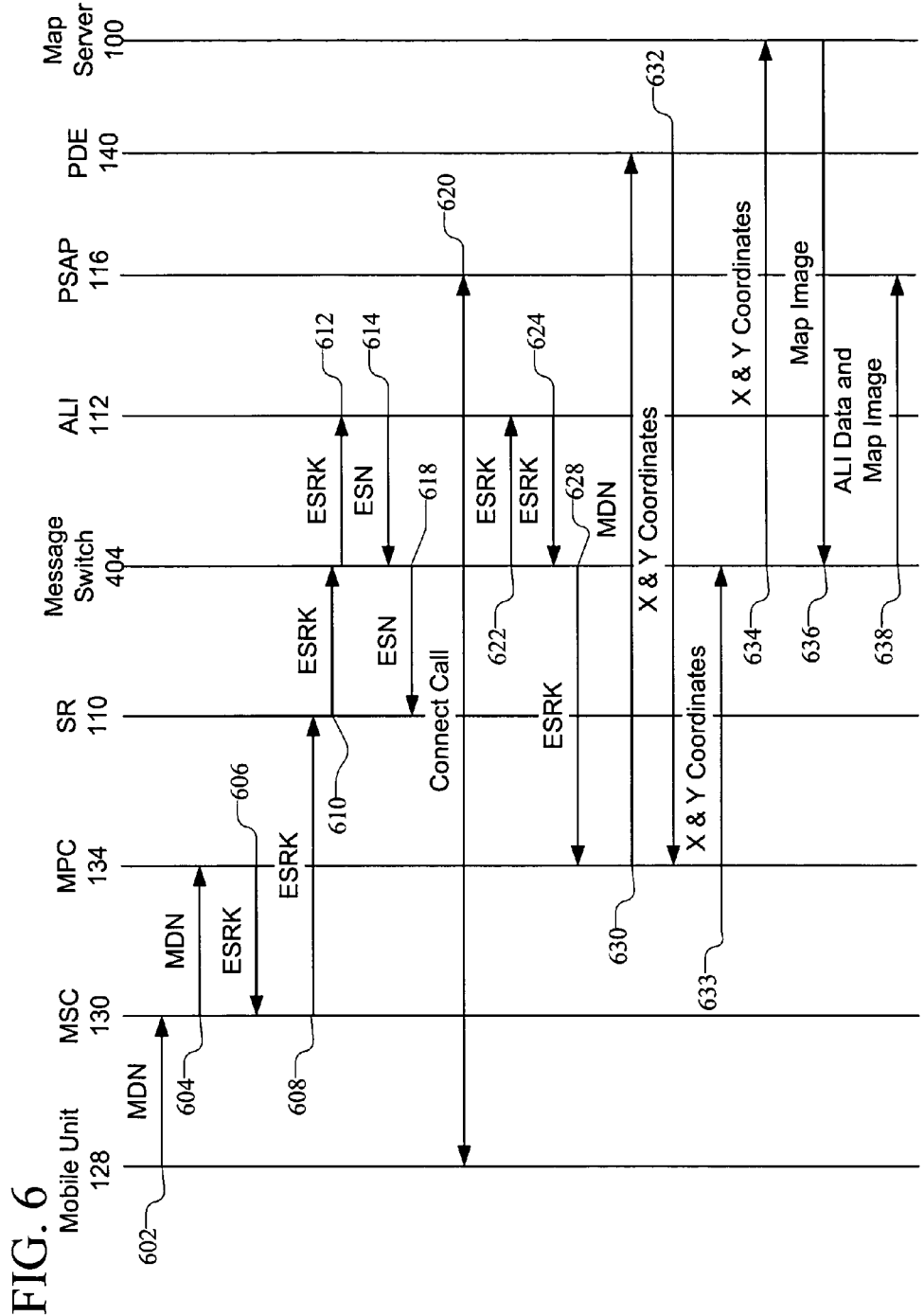
FIG. 6 is a communications flow diagram illustrating a call flow for a wireless call among the components of the exemplary telecommunications network of FIG. 4.

Turning now to FIG. 6, a call flow that supports a wireless call in the context of the architecture of FIG. 4 is described. An emergency call is placed from wireless unit 128, which includes the MDN of the wireless unit 128, to the MSC 130 (602). MSC 130 forwards the MDN to the MPC to obtain an ESRK (604). MPC 134 returns the ESRK to MSC 130 (606), which then forwards the ESRK to the selective router 110 (608).

Selective router 110 sends the ESRK to message switch 404 (610). Message switch 404 sends the ESRK to ALI node 112 (612). ALI node 112 sends the ESN of PSAP 116 to message switch 404 (614), which forwards the ESN to selective router 110 (618). Selective router 110 connects mobile unit 128 to PSAP 116 (620).

At approximately the same time, message switch 404 sends the ESRK to the ALI node 112 (622) again in order to obtain information regarding mobile unit 128. In order to obtain a map image, ALI node 112 sends the ESRK to message switch 404 (624), which forwards the ESRK to MPC 134 (628) MPC 134 queries PDE 140 using the MDN as the key (630). PDE 140 delivers the x and y coordinates back to MPC 134 (632), which forwards them to message switch 404 (633).

Message switch 404 sends the x and y coordinates to map server 100 (634), which generates a map image and returns it to message switch 404 (636). Finally, message switch 404 delivers all ALI data and the map image to PSAP 116 (638) for use in handling the emergency call.

Figure 7:
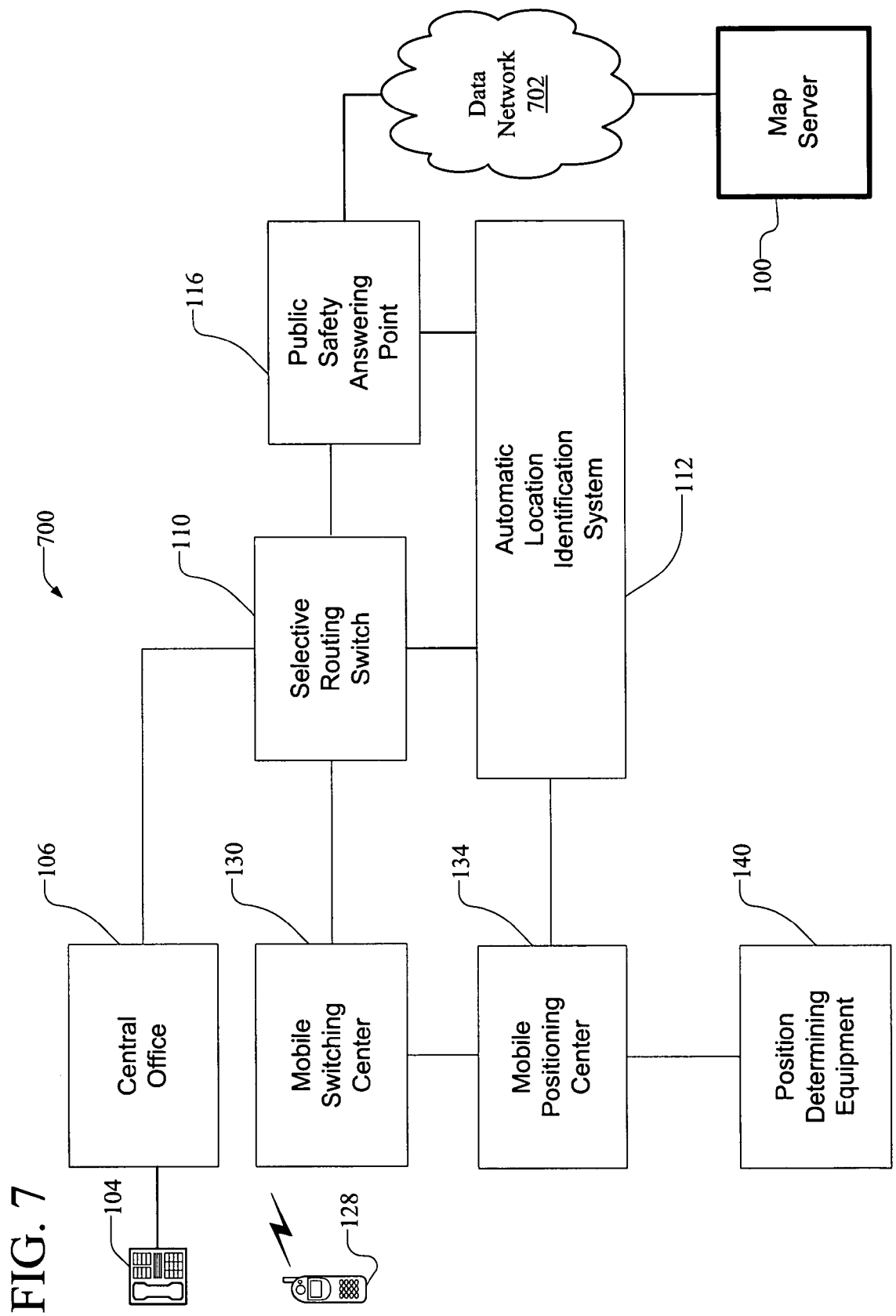
FIG. 7 is a block diagram of another exemplary telecommunications network in which an embodiment of this invention operates.

Turning now to FIG. 7, another exemplary embodiment of a network architecture in accordance with this invention is illustrated generally at 700. In this exemplary embodiment of this invention, PSAP 116 is connected via a data network 702 which may be a dedicated link to a remote server, a digital or analog line or trunk through the telephone network or a digital network, such as the Internet. In this manner, map server 100 may be accessed by many PSAP's and other agencies seeking a map image.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

The invention claimed is:

1. A method for delivering a map image supplemental to automatic location identification (ALI) data comprising:
   receiving a request for ALI data from an answering point, said request comprising a telephone number (TN);
   retrieving ALI data based on said TN;
   determining mapping information based on said TN;
   generating a map image at a central map server responsive to the mapping information; and
   delivering said map image with the ALI data to the answering point responsive to the request.

2. A method in accordance with claim 1 wherein determining mapping information based on said TN comprises retrieving geo-location coordinates associated with said ALI data.

3. A method in accordance with claim 1 wherein determining mapping information based on said TN comprises retrieving predetermined data from said ALI data and determining geo-location coordinates based on said predetermined data.

4. A method in accordance with claim 3 wherein determining geo-location coordinates based on said predetermined data comprises determining geo-location from a street address.

5. A method in accordance with claim 1 wherein determining mapping information based on said TN comprises determining mapping information based on an ANT of a calling telephone.

6. A method for delivering a map image supplemental to automatic location identification (ALI) data for a wireless device comprising:
   receiving a request for ALI data associated with the wireless device from an answering point, said request comprising an emergency services routing key (ESRK);
   retrieving ALI data based on the ESRK;
   determining mapping information based on the ESRK;
   generating a map image at a central map server responsive to the mapping information; and
   delivering the map image with the ALI data to the answering point responsive to the request.

7. A method in accordance with claim 6 wherein determining mapping information based on said ESRK comprises retrieving geo-location coordinates of the wireless device.

8. A method in accordance with claim 6 wherein determining mapping information based on said ESRK comprises requesting geo-location coordinates of the wireless device from the wireless network wherein the wireless device is located.

9. A method in accordance with claim 6 further comprising:
   querying a mobile positioning center in the wireless network for x and y coordinates.

10. A method for delivering a map image supplemental to automatic location identification (ALI) data for a wireline device comprising:
    receiving a request for ALI data associated with the wireline device from an answering point, said request comprising an routing key;
    retrieving ALI data based on the routing key;
    determining mapping information based on the routing key;
    generating a map image at a central map server responsive to the mapping information; and
    delivering the map image with the ALI data to the answering point responsive to the request.

11. A method in accordance with claim 10 wherein said wireline device comprises a landline telephone.

12. A method in accordance with claim 10 wherein said wireline device comprises a voice over internet protocol device.

13. A method in accordance with claim 10 wherein said routing key comprises a telephone number of the wireline device.

14. A method in accordance with claim 10 wherein said routing key comprises an emergency services routing key.

15. A method in accordance with claim 10 wherein said routing key comprises an automatic number identification related to said wireline device.

* * * * *